Oct. 29, 1940.  F. A. GERMANN  2,219,686
AUTOMATIC JACK OR SAFETY DEVICE
Filed Feb. 21, 1938  2 Sheets-Sheet 2
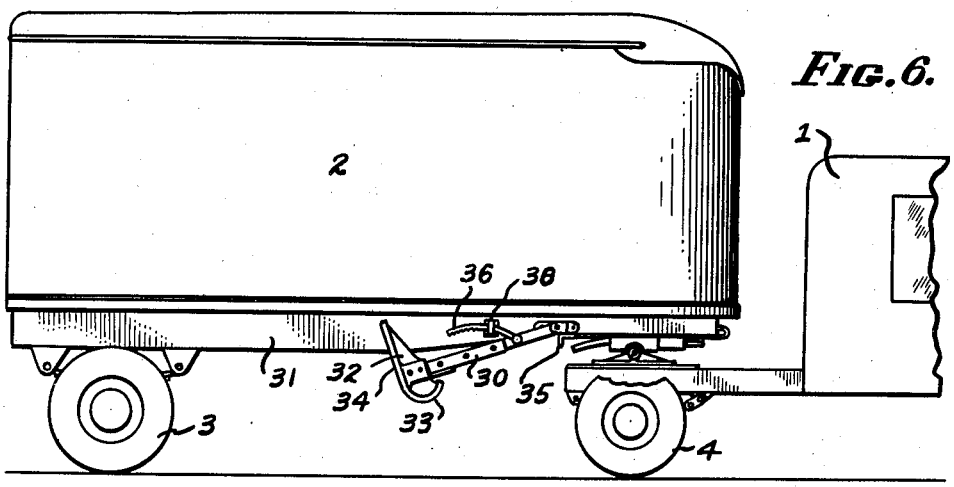
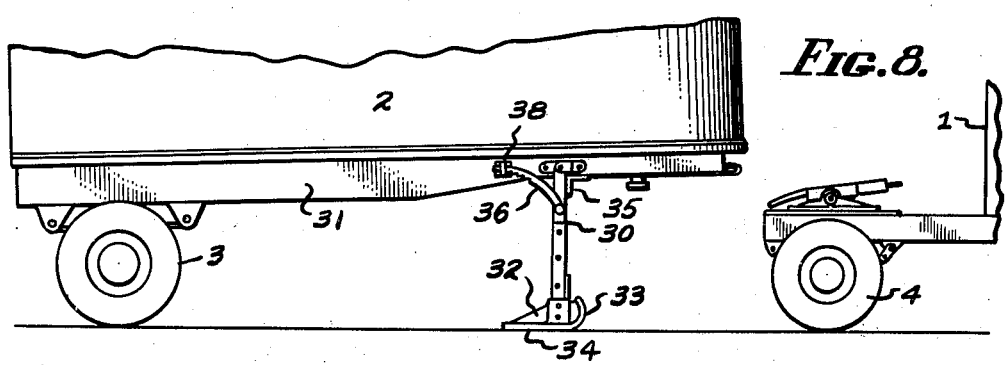
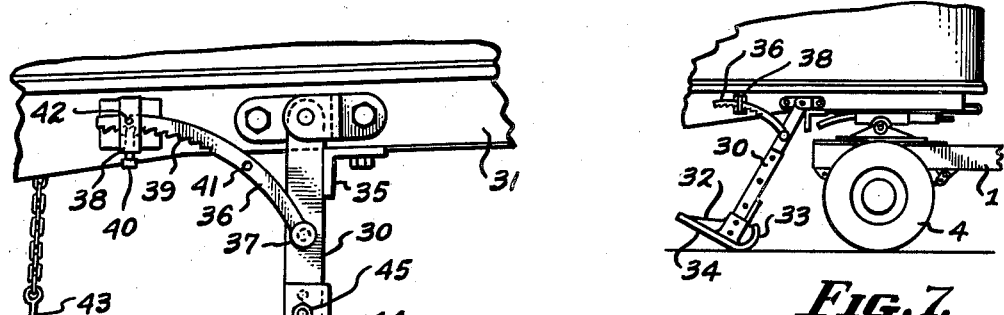
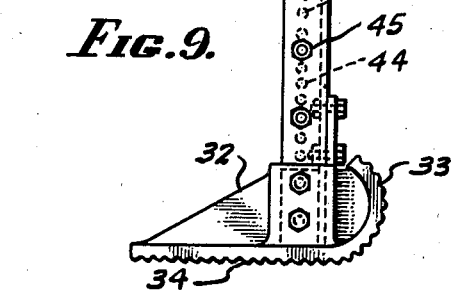
INVENTOR.
FRANK A. GERMANN.
BY Allen & Allen
ATTORNEYS.

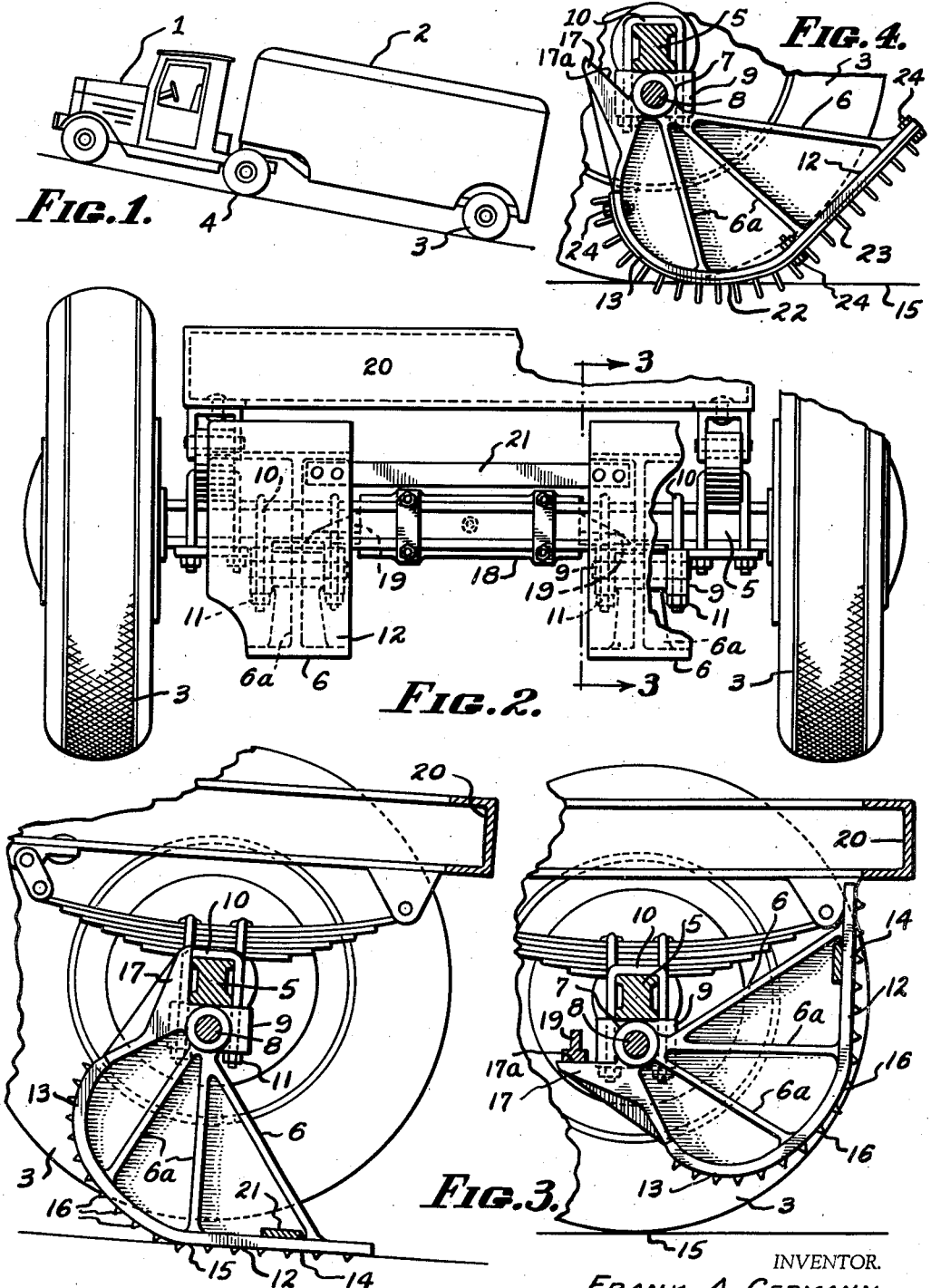

Patented Oct. 29, 1940

2,219,686

UNITED STATES PATENT OFFICE 2,219,686

AUTOMATIC JACK OR SAFETY DEVICE

Frank A. Germann, Ripley, Ohio

Application February 21, 1938, Serial No. 191,694

2 Claims. (Cl. 188—30)

My invention relates to an automatic jack or safety device for use on a vehicle to either raise up a portion of the vehicle from the ground so as to permit removal of the tires or the wheels without any manual effort on the part of the operator, or to prevent the reversal or movement of a vehicle down an incline if the brakes are unable to hold it.

In my exemplary embodiment I will describe my invention as applicable to a trailer both for use as a safety device on the trailer while in transport, and as a jack for supporting the front portion of the trailer when it is uncoupled from the tractor.

In view of the large size and weight of a loaded trailer while in transport, there is a decided danger when the trailer is going up an incline and the motor fails or the brakes are not sufficiently strong to hold the trailer, for it to roll back down the hill, thus creating a lot of damage and destruction. At times a heavy trailer has been known to become uncoupled from its tractor when on an incline, and the trailer portion to roll backwards down the hill.

It is an object of my invention to provide a safety device which in spite of the failure of the brakes of the trailer, or any other cause, will immediately prevent the trailer from rolling backwards down the hill.

It is a further object of my invention to provide a device as above described, which has the additional advantage of permitting the removal of the wheels or the tires on the same, from the body of the trailer when it is resting upon my novel safety device.

Another object of my invention is to provide a jack similar to that described above, but which may be mounted forwardly on the trailer just behind the coupling point and which upon backing up of the trailer will lift and support the front end of the trailer from the tractor, during loading.

These and other objects of my invention which will be set forth hereinafter, or will be apparent to one skilled in the art upon reading these specifications, I accomplish by that certain construction and arrangement of parts of which I shall now describe a preferred embodiment.

Reference is now made to the drawings which form a part hereof and in which:

Figure 1 shows a trailer and tractor of the usual type proceeding up an incline and on which my invention may be placed.

Fig. 2 shows the rear end of a trailer carrying my safety device.

Fig. 3 is a section taken on the section lines 3—3 of Fig. 2, and showing my safety device in its inoperative carrying position.

Fig. 4 shows a modification of my safety device, or my safety device carrying a removable tread.

Fig. 5 is a cross-section similar to that in Fig. 3, showing my safety device in its operative position.

Fig. 6 is a side view of a trailer carrying my invention used as an automatic jack in its inoperative position.

Fig. 7 is a side view of the front portion of the trailer showing the automatic jack in its intermediate position.

Fig. 8 is a side view of a trailer showing my automatic jack supporting the trailer after it has been unhitched from the tractor.

Fig. 9 is a more detailed view of the side of my automatic jack.

Briefly in the practice of my invention as a safety device, I provide a casting or castings shoe or shoes, mounted on the rear axle or the rear end of the chassis of a trailer, and normally held away from the road in a non-operative position. When the motor of the tractor fails, and the brakes are unable to hold the tractor and trailer on an incline, the castings are released and contact the roadway, and due to the movement of the trailer down the incline, lift the axle and the rear wheels upwardly from the roadway and thus prevent any further movement down the incline, of the trailer.

This same principle of my invention is applied when using my device as a jack for supporting the front of a trailer when it is detached from the tractor. In this instance the shoe or the casting is dropped before the tractor is unhitched, and the backing of the tractor forces the trailer up on the shoe. This lifting of the end of the trailer assists in uncoupling the tractor and supports the trailer end when the tractor is unhitched.

Referring to the drawings, the usual trailer combination consists of a tractor 1, and a trailer body 2, which is hitched to the tractor 1, by resting on the rear of the tractor on means which permit an easy pivoting of the joint to permit the trailer combination to turn sharp corners. The trailer itself 2, carries usually two wheels 3 on its rear end, while the front end is supported by the rear wheels 4 of the tractor 1. There is no motive power which drives a trailer since it is pulled by the tractor alone.

My invention in its exemplary embodiment is attached to the rear axle 5 of the trailer and consists of a casting 6, of a shape which will be described later, and having a boss 7, through which a shaft 8 is journaled. Independent bosses 9 are also journaled on the shaft 8, and are attached to the axle 5, by means of U-bolts 10, carrying nuts 11. The bosses 9 straddle the bosses 7, and by this construction holds the casting 6 to the axle 5 in such a manner that it may be swung in a vertical plane.

The casting 6 carries a tread 12, which defines a curve of increasing radii 13, about the shaft 8, and which terminates into a tangential tail or flat portion 14. The initial radius of the curve defined by the tread is shorter than the distance from the shaft 8 to the ground 15, while the maximum radius of the curve of the tread 12 where it resolves into the flat portion 14, is greater than the distance between the shaft 8 and the roadway 15.

The casting or shoe 6, is preferably webbed and strengthened by struts 6a, and the tread 12 preferably carries hobs or spikes 16. There is a projection 17 projecting beyond the shaft 8 in relation to the rest of the casting 6, and which has an abutting surface 17a. I provide means for holding the casting 6 against gravitational pull, so that the initial or shortest radius of curvature of the tread is below the shaft 8, and thus so that the tread 12 will not contact the road as is illustrated in Fig. 3. When this means is removed the pull of gravity brings the casting 6 downwardly toward the roadway 15, and in contact therewith, and a backward motion (to the right in drawings 1, 3 and 5 rocks the casting and hence lifts the axle 5 upwardly, until the axle 5 and the weight of the trailer carried thereby, rests on the flat portion 14 of the casting 6 (see Fig. 5).

The abutment 17a in my exemplary embodiment, contacts and abuts the means for holding the casting 6 away from the road, as in Fig. 3, when my safety device is not in use, and the abutment 17a abuts the axle 5, when my safety device is in operation as in Fig. 5, and thus prevents the trailer 2 from riding back over the casting 6.

In my preferred embodiment, I have shown a holding means 18 mounted on the axle 5, and having latch means 19 which project out parallel to the axle 5, and abut against the abutment 17a to hold the casting 6 up. The holding means 18 may be of any construction, and is preferably controlled from the cab of the tractor 1.

From the above it is apparent that if the trailer 2 starts to back down a hill, the driver by actuating the holding means 18, draws in the latches 19, which permits the casting 6 to drop to the road until the portion 13 of the tread 12 contacts the road. Due to the continuing rear movement of the trailer 2, and the increasing curvature of the portion 13 of the tread 12, the rear axle 5 of the trailer 2, rides up on the casting 6 until the flat portion 14 of the tread 12 rests against the road 15. In this position the rear wheels 3 of the trailer 2, are lifted off of the ground 15, and the hobs 16 on the tread 12 prevent any sliding action of the casting 6, and any further movement of the trailer 2. It may be preferable in some cases to attach a heavy chain from the end of the tread 14 to the rear portion 20 of the chassis of the trailer 2, to reinforce or take the place of the abutment 17a.

In my exemplary embodiment, I have shown two castings or shoes 6 on the rear axle of the trailer, and with a bar 21 attaching the two together. In some cases the use of the bar 21 may be preferable, while in others entirely unnecessary.

In the modification shown in Fig. 4, I provide a casting 6 in all ways similar, and similarly attached as to that described above, but I also provide a detachable supplementary tread 22, carrying a plurality of long spikes 23, and which may be attached to the tread 12 of the casting 6, by the use of bolts and nuts 24. The modification shown in Fig. 4 is for use when traveling over sand or gravel roads.

In using my invention as an automatic jack for supporting the front end of the trailer, I provide at least one arm 30, which is pivoted to the side of the chassis 31. On the end of the arm 30 is a shoe 32 the front end of which is constructed to define a curve with increasing radii 33, and terminating in a flat portion 34. I provide an abutment 35 which may be bolted to the chassis 31, in such a position that the arm 30 may not swing further forward than at right angles to the chassis 31.

In order to hold down the shoe 32 in its operative position as in Fig. 8, I provide an arm 36, pivoted at 37 to the arm 30, and which slides through a hasp 38. The bottom portion of the arm 36 may be notched as at 39, and the hasp 38 may carry a spring pin 40, urging it against the notches 39, and thus preventing a backward movement of the arm 36, as is illustrated in Fig. 9. There is a hole 41 in the arm 36, and a hole 42 in the side of the hasp 38. When the shoe 32 is in its inoperative position as in Fig. 6, the holes 42 and 41 are in registry and a pin 43 may be inserted through both holes to prevent the dropping of the shoe 32.

So that my automatic jack may be used on trailers of different types wherein the chassis 31 is normally at different heights from the roadway, I make the length of the leg 30 adjustable by making the leg in two portions, each of which carries a plurality of registrable holes 44 containing bolts 45, in a manner well known in the art. It is obvious by this construction that by different registry of the holes 44 and movement of the bolts 45, the leg 30 may be adjusted as to length.

From the above description, it is apparent that due to the configuration of the tread of my safety device or automatic jack, which in effect defines a portion of an Archimedes spiral, that very little force is required to either lift the rear wheels of the trailer off of the ground, or the front part of the trailer up and away from the tractor. Inasmuch as a flat tangential portion of the tread terminates the curved portion, and inasmuch as this flat portion is at right angles to the leg of the jack, or the gravitational line of the safety device, the trailer will not tend to rock off of my device after it has once ridden up on it.

While in my preferred embodiment, I have described a way of mounting my device, it is very apparent from the above description that there are numerous other manners of mounting my device on a vehicle, as well as numerous other portions of the vehicle on which my device may preferably be mounted.

It is to be understood that different forms of my preferred form may be made without departing from the spirit of my invention.

Having thus described my invention, what I claim as new and desire to secure by Letters Patent of the United States is:

1. In combination with a vehicle, safety means for preventing reverse motion comprising a shoe formed of a reenforced web pivoted with respect to said vehicle and having a tread formed with a cam shaped forward portion and a planar rearward portion adapted to contact a roadway over a substantial distance, releasable means for normally holding said shoe out of contact with the roadway, and stop means for bringing said shoe to rest with said planar portion contacting said roadway, said vehicle having wheels and an axle, the pivot point of said shoe being adjacent to the pivot point of said wheels, and said stop means comprising a shoulder on said shoe adapted to contact and rest against said axle.

2. In combination with a vehicle, safety means for preventing reverse motion comprising a shoe formed of a reenforced web pivoted with respect to said vehicle and having a tread with a cam shaped forward portion and a planar rearward portion adapted to contact a roadway over a substantial distance, stop means for bringing said shoe to rest with said planar portion contacting said roadway, said vehicle having wheels and an axle, the pivot point of said shoe being adjacent to the pivot point of said wheels and said stop means comprising a shoulder on said shoe adapted to contact and rest against said axle, and releasable means for normally holding said shoe out of contact with the roadway comprising a latch which said shoulder contacts and rests against.

FRANK A. GERMANN.